(12) United States Patent
Wu et al.

(10) Patent No.: US 10,763,900 B2
(45) Date of Patent: Sep. 1, 2020

(54) ANTENNA MODULE, MOBILE TERMINAL AND METHOD FOR TUNING THE ANTENNA MODULE

(71) Applicant: AAC Technologies Pte. Ltd., Singapore (SG)

(72) Inventors: Jing Wu, Shenzhen (CN); Haibing Chen, Shenzhen (CN); Ke Hua, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/699,701

(22) Filed: Dec. 1, 2019

(65) Prior Publication Data

US 2020/0204199 A1 Jun. 25, 2020

(30) Foreign Application Priority Data

Dec. 24, 2018 (CN) .......................... 2018 1 1581064

(51) Int. Cl.
*H04B 1/00* (2006.01)
*H01Q 5/328* (2015.01)
*H01Q 1/48* (2006.01)
*H01Q 1/24* (2006.01)

(52) U.S. Cl.
CPC ............. *H04B 1/006* (2013.01); *H01Q 1/243* (2013.01); *H01Q 1/48* (2013.01); *H01Q 5/328* (2015.01)

(58) Field of Classification Search
CPC ...................................................... H04B 1/006
See application file for complete search history.

(56) References Cited

U.S. PATENT DOCUMENTS

| 2013/0257712 | A1* | 10/2013 | Imamura | G06F 1/1658 345/156 |
| 2017/0005413 | A1* | 1/2017 | Tai | H01Q 1/243 |
| 2019/0081393 | A1* | 3/2019 | Zhou | H01Q 1/20 |
| 2019/0198999 | A1* | 6/2019 | Ashrafi | H04L 5/12 |

* cited by examiner

*Primary Examiner* — Hsinchun Liao
(74) *Attorney, Agent, or Firm* — W&G Law Group LLP

(57) ABSTRACT

An antenna module and a mobile terminal are provided. The mobile terminal has a metal frame and a system grounding spaced apart from the metal frame. The antenna module has a radiating body formed in the metal frame and a parasitic element coupled to the radiating body. The radiating body is configured for generating a main harmonic, and the parasitic element is configured for generating a parasitic harmonic. The antenna module further has a first tuning circuit connected in series between the radiating body and the system grounding, and a second tuning circuit connected in series between the parasitic element and the system grounding. The antenna system has at least four operation modes. The antenna system of the present invention may cover the LTE low, medium and high frequencies as a single antenna. A flexible and convenient method for tuning the antenna module is also provided.

11 Claims, 8 Drawing Sheets

ANTENNA MODULE, MOBILE TERMINAL AND METHOD FOR TUNING THE ANTENNA MODULE

FIELD OF THE PRESENT INVENTION

The present invention relates to the field of communication technology, and more particularly to an antenna module, a mobile terminal and a method for tuning the antenna module.

DESCRIPTION OF RELATED ART

As the development of communication technology, cell phones, PADs and laptops have gradually become essential electronic products in our life. These electronic products are all implemented with an antenna module such that they can have communication function.

Design of size and appearance of a mobile terminal is one important focus nowadays. In order to meet users' requirement, current mobile terminals are usually designed to have a bezel-less screen, a glass back cover and a metal frame. A communication device with a bezel-less screen may only provide very small clearance space or even no clearance space, which may deteriorate the performance and bandwidth of a single antenna and brings large difficulty to design of low frequency coverage and carrier aggregation (CA). Furthermore, as the fifth-generation communication is coming, mobile communication terminals would support a transmitting system with more Multiple-Input Multiple-Output (MIMO) antennas for cell phones in order to raise transmission speed and increase transmission capacity, which means the antenna arrangement of cell phones would be upgraded from 2*2 or 4*4 to 8*8. This gives further difficulties to antenna design.

Therefore, a new antenna module is required to solve the above problems.

BRIEF DESCRIPTION OF THE DRAWINGS

In order to clearly explain the technical solutions in the embodiments of the present invention, the drawings used in the description of the embodiments will be briefly described below. Obviously, the drawings in the following description are merely some embodiments of the present invention. For those of ordinary skill in the art, other drawings may also be obtained based on these drawings without any creative work.

DETAILED DESCRIPTION OF THE EXEMPLARY EMBODIMENT

The disclosure will now be described in detail with reference to the accompanying drawings and examples. Apparently, the described embodiments are only a part of the embodiments of the present invention, not all of the embodiments. All other embodiments obtained by a person of ordinary skill in the art based on the embodiments of the present invention without creative efforts shall fall within the protection scope of the present invention.

Figure 1:
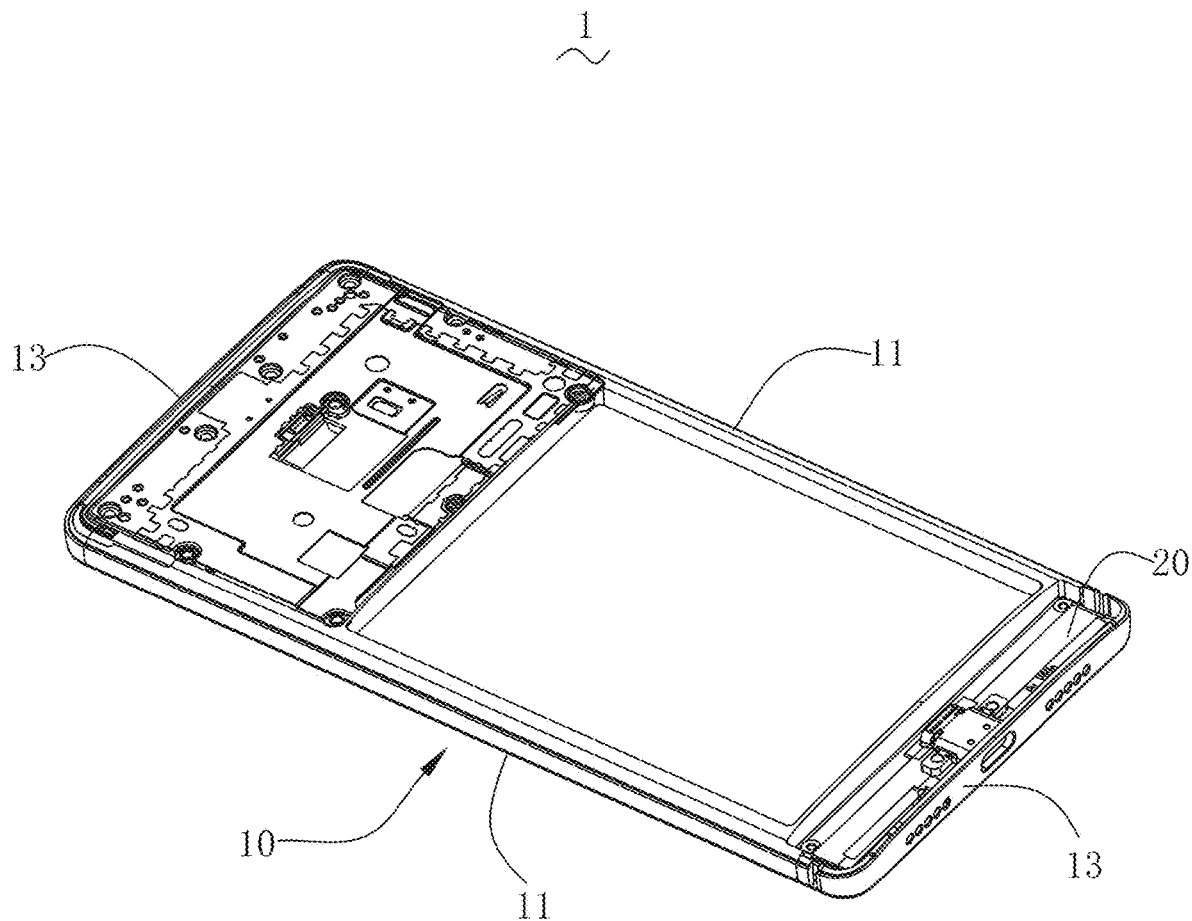
FIG. 1 shows an isometric view of a portion of a mobile terminal according to the present invention.
Figure 2:
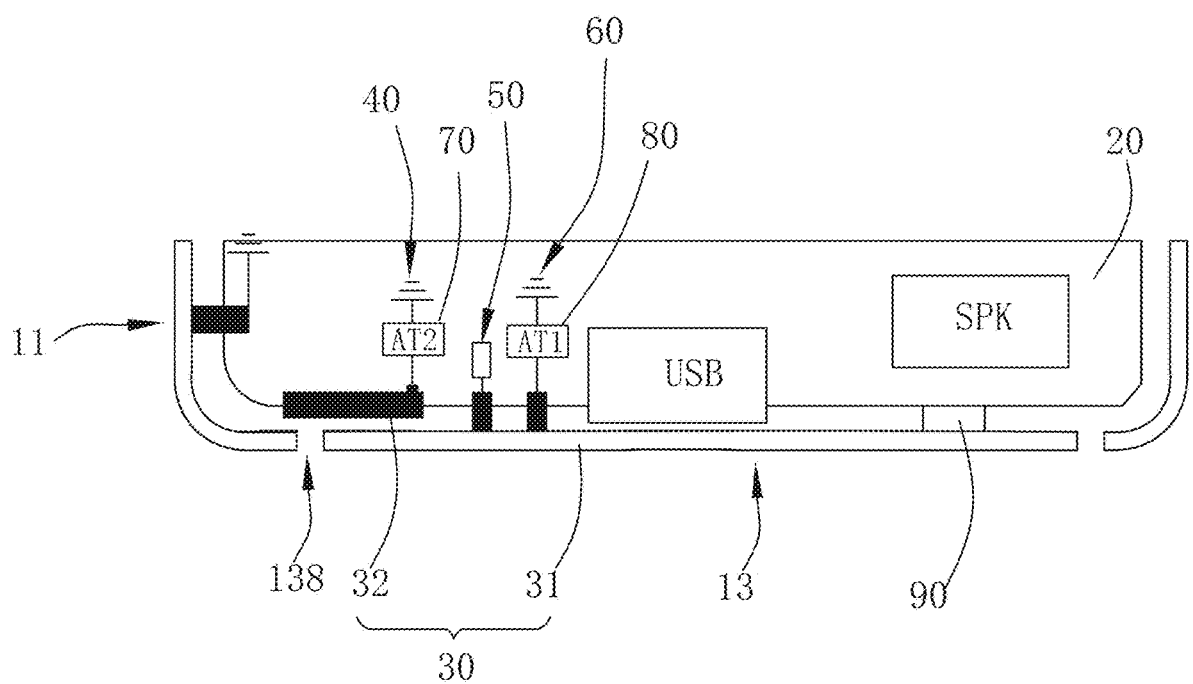
FIG. 2 shows a schematic diagram of a antenna module implemented in a mobile terminal according to the present invention.

As shown in FIGS. 1 and 2, the present invention provides a mobile terminal 1. The mobile terminal 1 may be a cell phone, tablet computer, multi-media player etc. In order to be advantageous for understanding, a cell phone will be taken as an example in following embodiments.

The mobile terminal 1 includes a metal frame 10, a system grounding 20 spaced from the metal frame 10, and an antenna module 30.

The metal frame 10 includes two oppositely arranged longitudinal frames 11 and two oppositely arranged lateral frames 13. The longitudinal frames 11 and the lateral frames 13 are connected successively to form the metal frame 10. The lateral frame 13 defines a gap 138 and a connector 90 connected to the system grounding 20.

The antenna module 30 includes a radiating body 31 formed in the metal frame 10 and a parasitic element 32 coupled to the radiating body 31. Specifically, the radiating body 31 may be a portion of the metal frame 10 located between the connector 90 and the gap 138. The parasitic element 32 may be a metal layer having an elongated shape and electrically connected to the system grounding 20.

The antenna module 30 may further include a feed line 50 connected to the radiating body 31, a parasitic line 40 connecting the parasitic element 32 and the system grounding 20, and a grounding line 60 connecting the radiating body 31 and the system grounding 20. The parasitic line 40 and the grounding line 60 may be arranged at two sides of the feed line 50.

The antenna module 30 only takes very small space of the mobile terminal. A distance between the connector 90 and an end of the radiating body 31 away from the connector 90 may be no larger than ⅔ of a length of the lateral frame 13. The distance here refers to a distance along the extending direction of the lateral frame.

Furthermore, the system grounding 20 and the lateral frame 13 are spaced apart to form a small clearance zone. Specifically, a width of the clearance zone may be less than 2 mm. The width here refers to a size along the direction pointing from the system grounding 20 to the lateral frame 13.

In the antenna module 30, the radiating body 31 is configured for generating a main harmonic, and the parasitic element 32 is configured for generating a parasitic harmonic. In order to tune the main harmonic, the feed line 60 may be implemented with a first tuning circuit 80. In order to tune the parasitic harmonic, the parasitic line 40 may be implemented with a second tuning circuit 70.

The antenna module 30 may include at least four operation modes described below.

In a first operation mode, the first tuning circuit 80 may switch among multiple operation states such that the main harmonic covers an LTE low frequency and switches among multiple wave bands of the LTE low frequency. The second tuning circuit 70 is configured to keep one operation state such that the parasitic harmonic covers LTE medium and high frequencies.

In a second operation mode, the first tuning circuit 80 may switch among multiple operation states such that the main harmonic may cover the LTE low frequency and switch among multiple wave bands of the LTE low frequency. The second tuning circuit 70 may switch among multiple operation states such that the parasitic harmonic may cover the LTE medium frequency and switch among multiple wave bands of the LTE medium frequency.

In a third operation mode, the first tuning circuit 80 may switch among multiple operation states such that the main harmonic may cover the LTE low frequency and switch among multiple wave bands of the LTE low frequency. The second tuning circuit 70 may switch among multiple operation states such that the parasitic harmonic may cover the LTE high frequency and switch among multiple wave bands of the LTE high frequency.

In a fourth operation mode, the first tuning circuit 80 is configured to keep one operation state such that the main harmonic may cover the LTE medium and high frequencies. The second tuning circuit 70 is configured to keep one operation state such that the parasitic harmonic may cover the LTE medium and high frequencies.

In some embodiments, in any of the first, second and third operations modes, the first tuning circuit 80 may be grounded through an inductor. That is, by switching the inductance, the main harmonic may operate in different low frequency wave bands.

In the fourth operation mode, the first tuning circuit 80 may be grounded through an inductor or a capacitor, or be short-circuited to ground. In other word, in this operation mode, the specific structure of the first tuning circuit 80 is not limited as long as the main harmonic may be tuned to the medium and high frequencies.

In the first operation mode, the second tuning circuit 70 may include at least one small-capacitance capacitor. The small-capacitance capacitor may have a capacitance less than 0.8 pF. In any of the second, third and fourth operation modes, the second tuning circuit 70 may be grounded through a capacitor or a combination of an inductor and a capacitor.

Figure 3:
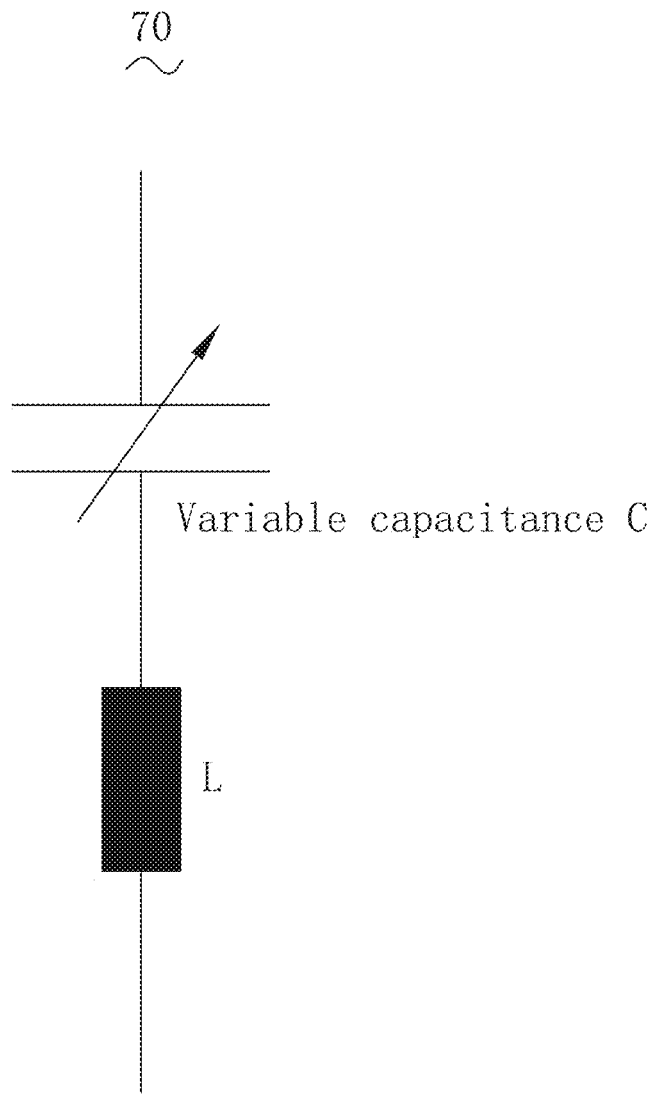
FIG. 3 is a topological structure diagram of a second tuning circuit according to the present invention.
Figure 4:
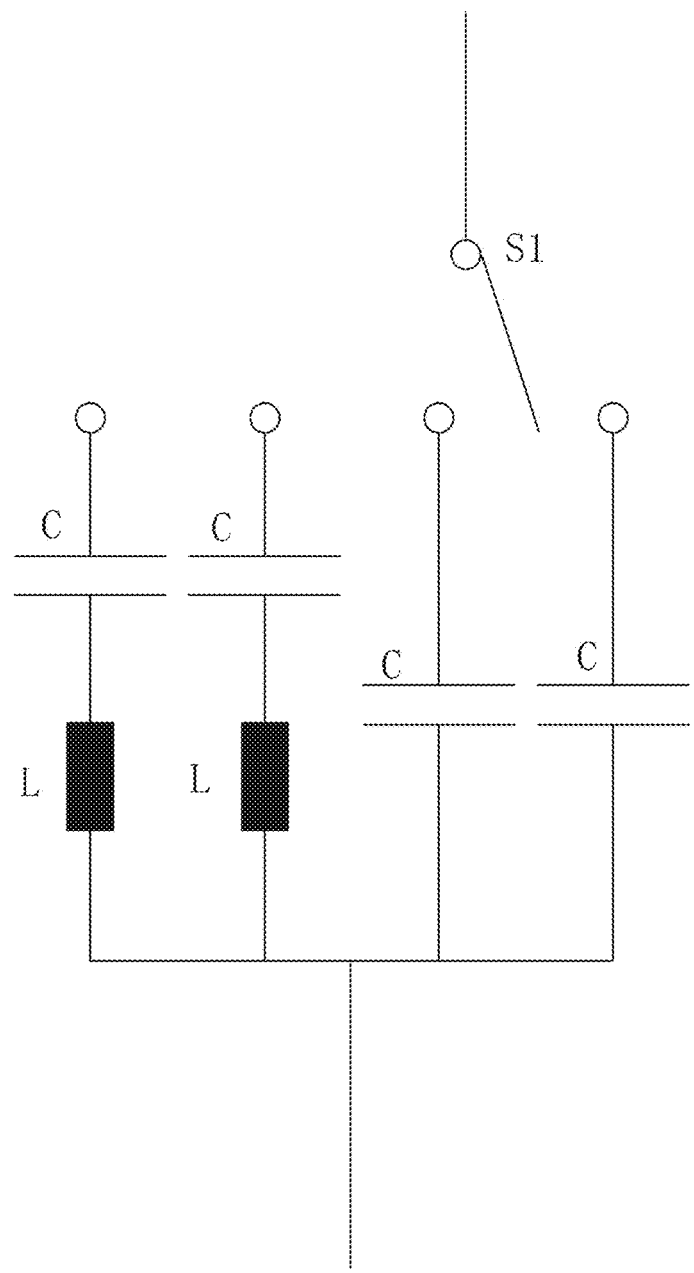
FIG. 4 is another topological structure diagram of a second tuning circuit according to the present invention.
Figure 5:
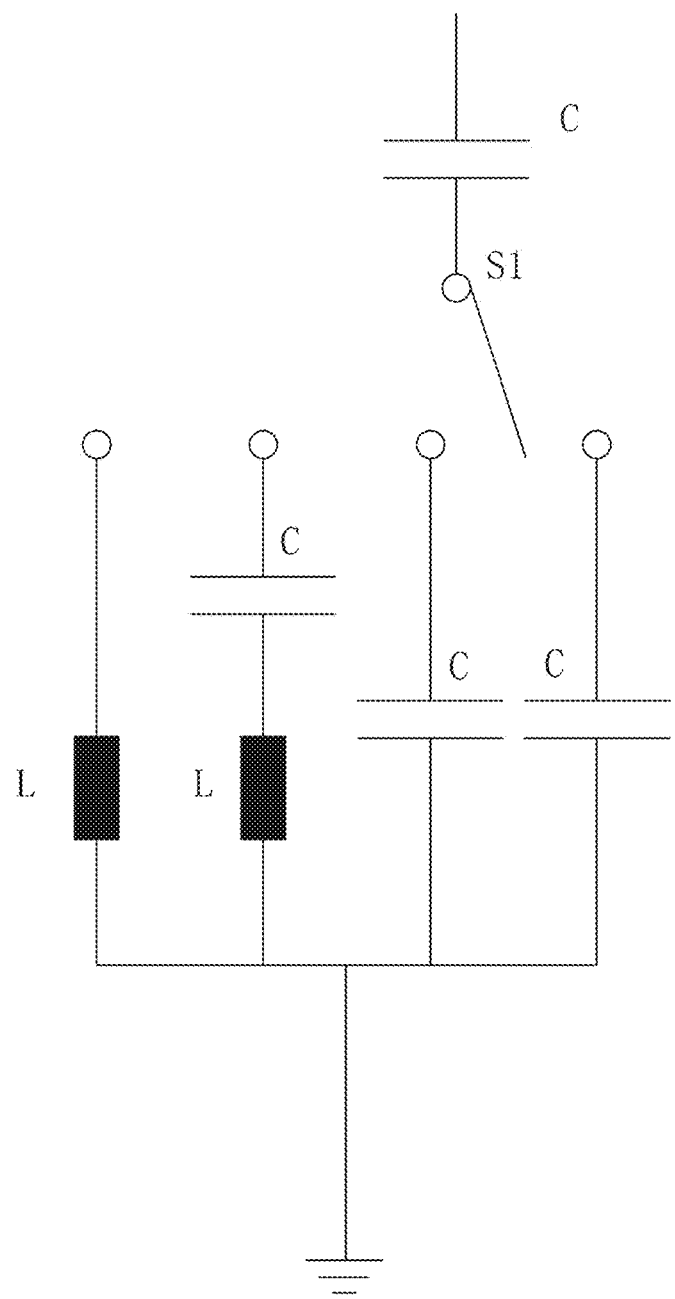
FIG. 5 is yet another topological structure diagram of a second tuning circuit according to the present invention.

Specifically, FIGS. 3-5 show different embodiments of the structure of the second tuning circuit 70. In the embodiment of FIG. 3, the second tuning circuit 70 may include a variable capacitor C and an inductor L connected in series. In the embodiment of FIG. 4, the second tuning circuit 70 may have four branches that may be selectively switched on in different operation states. A capacitor C is connected in series in each of the branches, and an inductor L is connected in series in some of the branches. In the embodiment of FIG. 5, the second tuning circuit 70 also has four branches that may be selectively switched on in different operation states, which is similar to the embodiment of FIG. 4. However, in this embodiment, a capacitor C in connected in series to the primary line, and the branches may be implemented either with or without a capacitor. It should be noticed that, FIGS. 3-5 are merely three exemplary embodiments of the second tuning circuit 70, and the topological structure of the second tuning structure 70 is not limited thereto as long as the portion of the second tuning circuit 70 that is switched on may include a capacitor connected in series in each operation state. Specifically, in the first operation mode, the second tuning circuit 70 may be implemented with a capacitor with small capacitance in order to reduce influence of the parasitic element 32 on low frequencies. The reason is that, in general, the capacitance coupling effect between the parasitic element 32 and the system grounding 20 may deviate the frequency of the low frequency harmonic to a lower value to a certain extent, which requires the diameter of low frequency radiating body to be reduced and leads to a degradation of the low frequency performance. Thus, in the present invention, in order to reduce influence of the parasitic element 32 on low frequency and improve low frequency performance, a capacitor is connected in series in the second tuning circuit 70 which may reduce interference of the parasitic element 32 on low frequencies and enhance low frequency performance of the antenna. In other words, the capacitor is connected in series to the coupling capacitance between the parasitic element 32 and the radiating body 31 so as to reduce interference on low frequencies.

It should be noticed, the position of the antenna module 30 on the metal frame 10 is not limited in the present invention. For example, the antenna module 30 may be set on either the lateral frame 13 or the longitudinal frame 11.

The present invention also provides a method for tuning an antenna module. The structure of the antenna module may be similar to that described above, and will not be repeated herein.

The method for tuning the antenna module may include operations below.

A first operation mode is provided. In the first operation mode, the main harmonic covers the LTE low frequency, and the parasitic harmonic covers the LTE medium and high frequencies. In this mode, LTE low frequency performance is preferentially enhanced.

A second operation mode is provided. In the second operation mode, the main harmonic covers the LTE low frequency, and the parasitic harmonic covers the LTE medium frequency. In this mode, LTE medium frequency performance is preferentially enhanced.

A third operation mode is provided. In the third operation mode, the main harmonic covers the LTE low frequency, and the parasitic harmonic covers the LTE high frequency. In this mode, LTE high frequency performance is preferentially enhanced.

A fourth operation mode is provided. In the fourth operation mode, the main harmonic and the parasitic harmonic both cover the LTE medium and high frequencies so as to enhance the performance of LTE medium and high frequencies at the same time.

By providing four operation modes, the antenna module may achieve carrier aggregation of LTE low, medium and high frequencies. Furthermore, in each operation mode, the performance of a respective frequency band may be enhanced while the carrier aggregation is realized.

Generally, since the bandwidth of the LTE low, medium and high frequencies is large, a single harmonic cannot achieve good performance over the whole bandwidth. Thus, in the above operation modes, tuning of each frequency band may be achieved by controlling the first tuning circuit 80 and the second tuning circuit 70. Specifically, in the first operation mode, the first tuning circuit 80 switches among multiple operation states such that the main harmonic may switch among multiple wave bands of the LTE low frequency, and the second tuning circuit 70 is configured to keep one operation state. In the second operation mode, the first tuning circuit 80 switches among multiple operation states such that the main harmonic may switches among multiple wave bands of the LTE low frequency, and the second tuning circuit 70 switches among multiple operation states such that the parasitic harmonic may switch among multiple wave bands of the LTE medium frequency. In the third operation mode, the first tuning circuit 80 switches among multiple operation states such that the main harmonic may switch among multiple wave bands of the LTE low frequency, and the second tuning circuit 70 switches among multiple operation states such that the parasitic harmonic may switch among multiple wave bands of the LTE high frequency.

In order to enhance the medium and high frequencies at the same time, in the fourth operation mode, the first tuning circuit 80 is configured to keep one operation state, and the second tuning circuit 70 is configured to keep one operation state. In this situation, the first and second tuning circuits 70 and 80 both operate in the medium and high frequencies.

Further, in the first, second and third operation modes, in order to reduce the switch of low frequency harmonic on medium and high frequencies, the first tuning circuit 80 is ground through an inductor in each operation state. However, in the fourth operation mode, the first tuning circuit 80 is not necessarily grounded through an inductor. For example, it can be grounded through an inductor or a capacitor, or be short-circuited to ground as long as the main harmonic may be tuned to medium and high frequencies.

Further, in any of the above four operation modes, the portion of the second tuning circuit 70 that is switched on is arranged with a capacitor. Specifically, in the first operation mode, the second tuning circuit 70 need to be implemented with a capacitor with small capacitance so as to reduce influence of the parasitic element 32 on the low frequency. The capacitance of the capacitor is preferably less than 0.8 pF. The reason is that, in general, the capacitance coupling effect between the parasitic element 32 and the system grounding 20 may deviate the frequency of the low frequency harmonic to a lower value to a certain extent, which requires the diameter of low frequency radiating body to be reduced and leads to a degradation of the low frequency performance. Thus, in the present invention, in order to reduce influence of the parasitic element 32 on low frequency and improve low frequency performance, a capacitor is connected in series in the second tuning circuit 70 which may reduce interference of the parasitic element 32 on low frequencies and enhance low frequency performance of the antenna. In other words, the capacitor is connected in series to the coupling capacitance between the parasitic element 32 and the radiating body 31 so as to reduce interference on low frequencies. In the above-mentioned second, third, and fourth operation modes, the second tuning circuit 70 is not necessarily arranged with a small-capacitance capacitor. For example, the second tuning circuit 70 may alternatively be grounded through a capacitor with relatively large capacitance or through a combination of a capacitor and an inductor.

Figure 6:
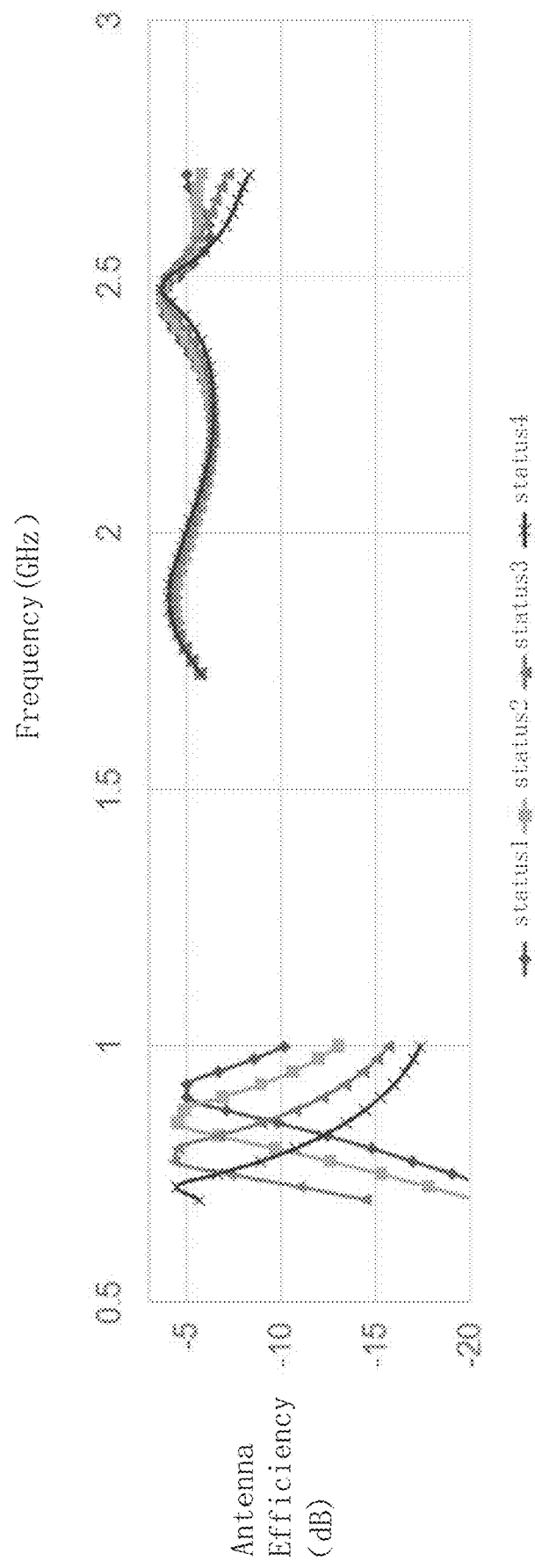
FIG. 6 illustrates a simulation result of the radiating efficiency of the antenna module of the present invention operating in a first operation mode.
Figure 7:
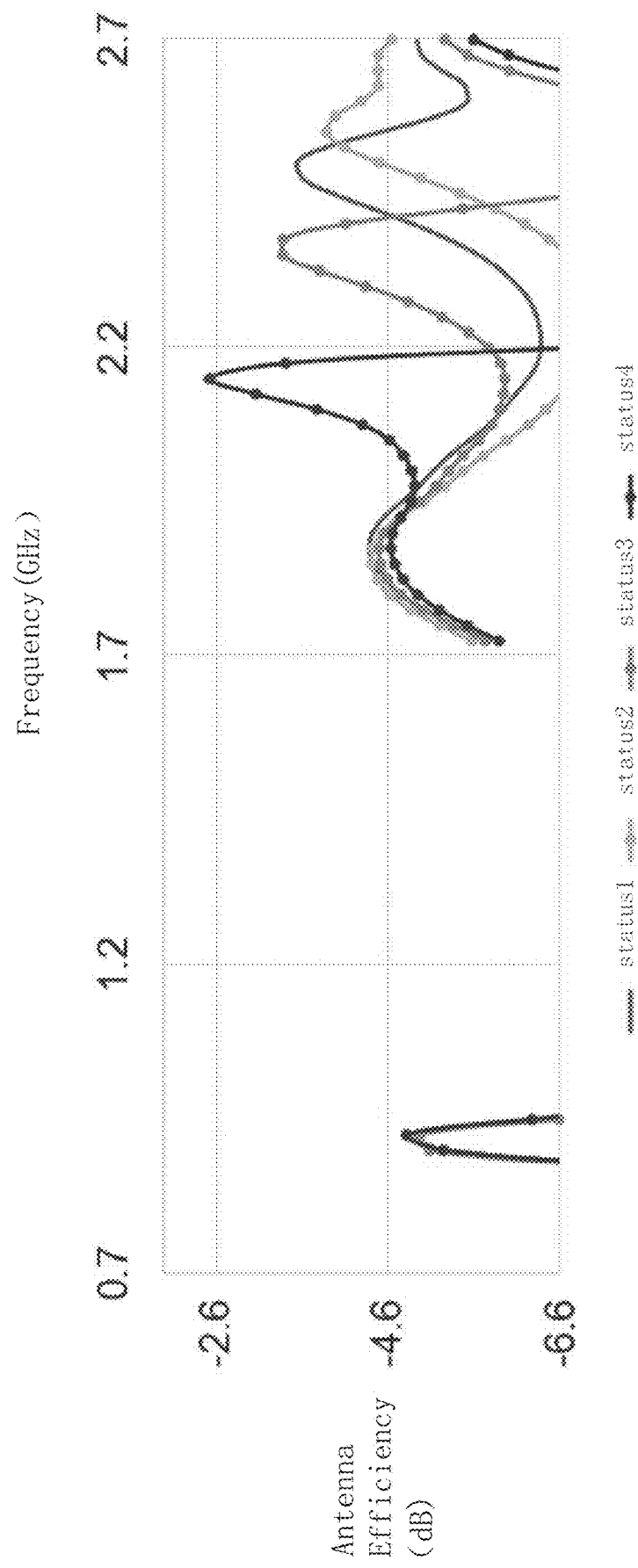
FIG. 7 illustrates a simulation result of the radiating efficiencies of the antenna module operating in a second operation mode and a third operation mode, and of the first tuning circuit operating in a certain operation state.

The performance of the antenna module 30 is shown in FIGS. 6 and 7. As shown in FIG. 6, when the antenna module is in the first operation mode, the first tuning circuit 80 may operate in four different operation states (State 1, State 2, State 3 and State 4). Correspondingly, the main harmonic may generate four different low frequency harmonics, and the parasitic harmonic may generate the medium and high harmonics. It can be seen from the curve that the performance of medium and high frequencies is substantially unchanged when the low frequency harmonic switches. As shown in FIG. 7, when the antenna module is in the second operation mode and the third operation mode and the antenna module 80 is in a certain operation mode, the second tuning circuit 70 may operate in four different operation states (State 1, State 2, State 3 and State 4). Correspondingly, the main harmonic may generate the low frequency harmonics and the parasitic harmonic may generate the low and/or high frequency harmonics. Compared with the first operation mode, the performance of medium and high frequency harmonic may be enhanced. It can be seen from the curve shown in FIG. 7 that the low frequency performance is substantially unchanged when the medium and high frequency harmonics switch.

Figure 8:
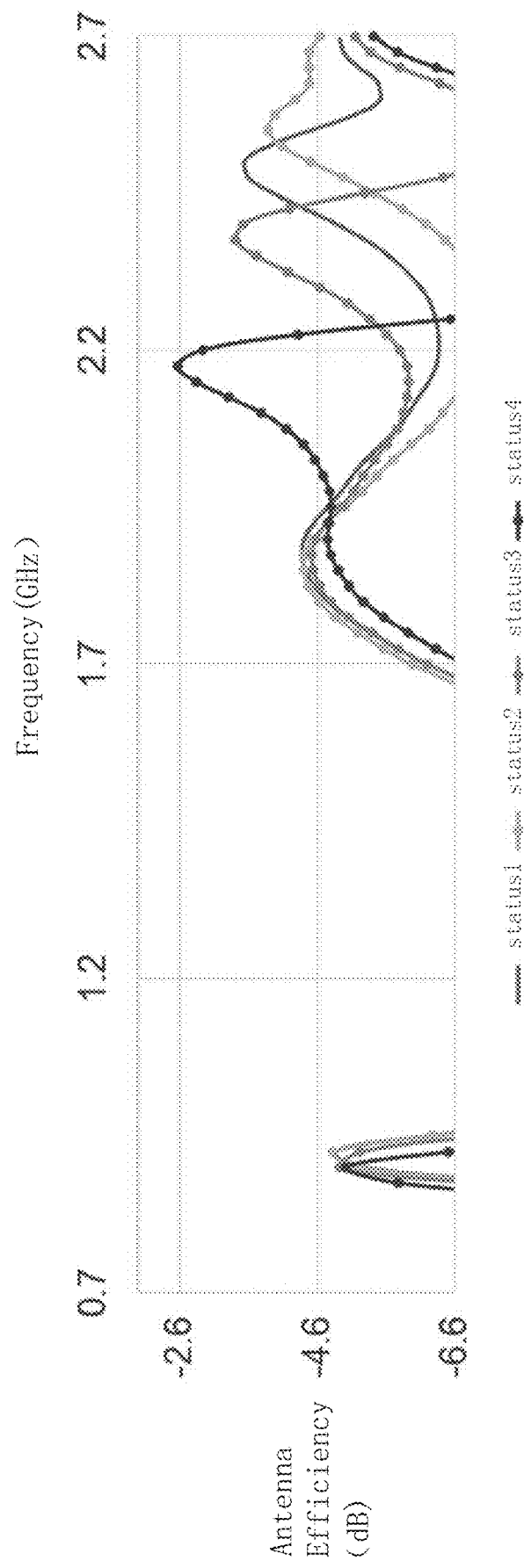
FIG. 8 illustrates simulation results of the radiating efficiency of a comparation antenna module.

FIG. 8 shows the radiating efficiency curve of a comparation antenna module. The comparation antenna module is similar to the antenna module as shown in FIG. 7. The difference is, the second tuning circuit 70 of the comparation antenna module is not implemented with a capacitor connected in series. It can be seen from the curve that significant deviation and degradation of the low frequency harmonic of the comparation antenna module occurs when the medium and high harmonics switch.

Compared with related art, the antenna module of the present invention may generate LTE medium and high frequency harmonics and achieve carrier aggregation of low, medium and high frequencies through a single antenna. The four operations modes may correspondingly enhance the performance in low, medium and high frequencies. According to the tuning method of the antenna module of the present invention, by connecting a capacitor in the parasitic line in series, influence of the parasitic element on the low frequency may be reduced. By connecting an inductor in the feed line to switch low frequency wave bands, influence of the low frequency on medium and high frequencies may be reduced. Thus, tuning of the low frequency may be relatively independent from tuning of the medium and high frequencies, which is flexible and convenient.

It should be noted that, the above are merely embodiments of the present invention, and further modifications can be made for those skilled in the art without departing from the inventive concept of the present invention. However, all these modifications shall fall into the protection scope of the present invention.

What is claimed is:

1. An antenna module for a mobile terminal, the mobile terminal comprising a metal frame and a system grounding spaced apart from the metal frame, where in the antenna module comprises a radiating body formed in the metal frame and a parasitic element coupled to the radiating body, the radiating body is configured for generating a main harmonic, and the parasitic element is configured for generating a parasitic harmonic;

the antenna module further comprises a first tuning circuit and a second tuning circuit, wherein, the first tuning circuit is connected in series between the radiating body and the system grounding, the second tuning circuit is connected in series between the parasitic element and the system grounding;

where in, the antenna module comprises at least four operation modes, wherein in a first operation mode, the first tuning circuit switches among multiple operation states such that the main harmonic covers an LTE low frequency and switches among multiple wave bands of the LTE low frequency, the second tuning circuit is configured to keep one operation state such that the parasitic harmonic covers an LTE medium frequency and an LTE high frequency, the second tuning circuit comprises one small-capacitance capacitor, a capacitance of the small-capacitance capacitor is less than 0.8 pF;

in a second operation mode, the first tuning circuit switches among multiple operation states such that the main harmonic covers the LTE low frequency and switches among multiple wave bands of the LTE low frequency, the second tuning circuit switches among multiple operation states such that the parasitic harmonic covers the LTE medium frequency and switches among multiple wave bands of the LTE medium frequency;

in a third operation mode, the first tuning circuit switches among multiple operation states such that the main harmonic covers the LTE low frequency and switches among multiple wave bands of the LTE low frequency, the second tuning circuit switches among multiple operation states such that the parasitic harmonic covers the LTE high frequency and switches among multiple wave bands of the LTE high frequency;

in a fourth operation mode, the first tuning circuit is configured to keep one operation state such that the main harmonic covers the LTE medium and high frequencies, the second tuning circuit is configured to keep one operation state such that the parasitic harmonic covers the LTE medium and high frequencies.

2. The antenna module of claim 1, further comprising a grounding line and a parasitic line, wherein the grounding line electrically connects the radiating body and the system grounding, the parasitic line electrically connects the parasitic element and the system grounding, the first tuning circuit is connected in series to the grounding line, the second tuning circuit is connected in series to the parasitic line.

3. The antenna module of claim 1, wherein in any of the first operation mode, the second operation mode and the third operation mode, the first tuning circuit is grounded through an inductor.

4. The antenna module of claim 1, wherein in the fourth operation mode, the first tuning circuit is grounded through an inductor or a capacitor, or the first tuning circuit is short-circuited to ground.

5. The antenna module of claim 1, wherein in any of the second operation mode, the third operation mode and the fourth operation mode, the second tuning circuit is grounded through a capacitor or a combination of an inductor and a capacitor.

6. A mobile terminal, comprising the antenna module of claim 1.

7. A method for tuning an antenna module for a mobile terminal, where in
the mobile terminal comprises a metal frame and a system grounding spaced apart from the metal frame;
the antenna module comprises a radiating body formed in the metal frame and a parasitic element coupled to the radiating body, the radiating body is configured for generating a main harmonic, and the parasitic element is configured for generating a parasitic harmonic;
the antenna module further comprises a first tuning circuit and a second tuning circuit, the first tuning circuit is connected in series between the radiating body and the system grounding, the second tuning circuit is connected in series between the parasitic element and the system grounding;
where in, the method comprises:
providing a first operation mode in which the main harmonic covers an LTE low frequency and the parasitic harmonic covers an LTE medium frequency and an LTE high frequency, and preferentially enhancing a performance of the LTE low frequency with respect to the LTE medium frequency and the LTE high frequency;

providing a second operation mode in which the main harmonic covers the LTE low frequency and the parasitic harmonic covers the LTE medium frequency, and preferentially enhancing a performance of the LTE medium frequency with respect to the LTE low frequency;

providing a third operation mode in which the main harmonic covers the LTE low frequency and the parasitic harmonic covers the LTE high frequency, and preferentially enhancing a performance of the LTE high frequency with respect to the LTE low frequency;

providing a fourth operation mode in which the main harmonic and the parasitic harmonic both cover the LTE medium frequency and the LTE high frequency to enhance the performance of the LTE medium frequency and the LTE high frequency at the same time.

8. The method for tuning the antenna module for the mobile terminal of claim 7, where in, in the first operation mode, the first tuning circuit switches among multiple operation states such that the main harmonic covers the LTE low frequency and switches among multiple wave bands of the LTE low frequency, the second tuning circuit is configured to keep one operation state, the second tuning circuit comprises one small-capacitance capacitor for reducing influence of the medium frequency and the high frequency on the low frequency, a capacitance of the small-capacitance capacitor is less than 0.8 pF;

in the second operation mode, the first tuning circuit switches among multiple operation states such that the main harmonic covers the LTE low frequency and switches among multiple wave bands of the LTE low frequency, the second tuning circuit switches among multiple operation states such that the parasitic harmonic covers the LTE medium frequency and switches among multiple wave bands of the LTE medium frequency;

in the third operation mode, the first tuning circuit switches among multiple operation states such that the main harmonic covers the LTE low frequency and switches among multiple wave bands of the LTE low frequency, the second tuning circuit switches among multiple operation states such that the parasitic harmonic covers the LTE high frequency and switches among multiple wave bands of the LTE high frequency;

in the fourth operation mode, the first tuning circuit is configured to keep one operation state such that the main harmonic covers the LTE medium and high frequencies, the second tuning circuit is configured to keep one operation state such that the parasitic harmonic covers the LTE medium and high frequencies.

9. The method for tuning the antenna module for the mobile terminal of claim 8, wherein in any of the first operation mode, the second operation mode and the third operation mode, the first tuning circuit is grounded through an inductor to reduce influence of the LTE low frequency on the LTE medium frequency and the LTE high frequency.

10. The method for tuning the antenna module for the mobile terminal of claim 8, wherein in the fourth operation mode, the first tuning circuit is grounded through an inductor or a capacitor, or the first tuning circuit is short-circuited to ground.

11. The method for tuning the antenna module for the mobile terminal of claim 8, wherein in any of the second operation mode, the third operation mode and the fourth operation mode, the second tuning circuit is grounded through a capacitor or a combination of an inductor and a capacitor.

\* \* \* \* \*